United States Patent
Gyllenhammar et al.

(10) Patent No.: US 12,240,487 B2
(45) Date of Patent: Mar. 4, 2025

(54) PLATFORM FOR PERCEPTION SYSTEM DEVELOPMENT FOR AUTOMATED DRIVING SYSTEMS

(71) Applicant: ZENSEACT AB, Gothenburg (SE)

(72) Inventors: Magnus Gyllenhammar, Pixbo (SE); Carl Zandén, Lindome (SE); Majid Khorsand Vakilzadeh, Mölndal (SE)

(73) Assignee: Zenseact AB, Gothenburg (SE)

(*) Notice: Subject to any disclaimer, the term of this patent is extended or adjusted under 35 U.S.C. 154(b) by 358 days.

(21) Appl. No.: 17/672,791

(22) Filed: Feb. 16, 2022

(65) Prior Publication Data
US 2022/0266856 A1    Aug. 25, 2022

(30) Foreign Application Priority Data
Feb. 19, 2021    (EP) .................................. 21158017

(51) Int. Cl.
| | |
|---|---|
| *B60W 60/00* | (2020.01) |
| *G06V 10/74* | (2022.01) |
| *G06V 10/80* | (2022.01) |
| *G06V 20/56* | (2022.01) |

(52) U.S. Cl.
CPC .......... *B60W 60/001* (2020.02); *G06V 10/74* (2022.01); *G06V 10/803* (2022.01); *G06V 20/56* (2022.01); *B60W 2555/00* (2020.02)

(58) Field of Classification Search
CPC .................................................... G06V 20/56
See application file for complete search history.

(56) References Cited

U.S. PATENT DOCUMENTS

| | | | | |
|---|---|---|---|---|
| 2018/0025234 A1* | 1/2018 | Myers | ................... | G08G 1/167 |
| | | | | 348/148 |
| 2018/0314921 A1* | 11/2018 | Mercep | ................... | G01S 15/86 |
| 2020/0210778 A1 | 7/2020 | Orlov | | |
| 2022/0230021 A1* | 7/2022 | Muehlenstaedt | .. | G06V 10/7753 |
| 2023/0160712 A1* | 5/2023 | Liu | ...................... | G06V 20/588 |
| | | | | 701/26 |

FOREIGN PATENT DOCUMENTS

| | | |
|---|---|---|
| WO | 2019/232335 A1 | 12/2019 |
| WO | 2020/056331 A1 | 3/2020 |
| WO | 2020/079698 A1 | 4/2020 |

OTHER PUBLICATIONS

European Search Report mailed Aug. 26, 2021 for European Application No. 21158017.0, 7 pages.

\* cited by examiner

*Primary Examiner* — Jaime Figueroa
*Assistant Examiner* — Jerrod Irvin Davis
(74) *Attorney, Agent, or Firm* — Sage Patent Group (57) ABSTRACT

The present invention relates to methods and systems that utilize the production vehicles to develop new perception features related to new sensor hardware as well as new algorithms for existing sensors by using federated learning. To achieve this, the production vehicle's own worldview is post-processed and used as a reference, towards which the output of the software (SW) or hardware (HW) under development is compared. Through this comparison, a cost function can be calculated and an update of the SW parameters can be locally updated according to this cost function.

11 Claims, 6 Drawing Sheets

PLATFORM FOR PERCEPTION SYSTEM DEVELOPMENT FOR AUTOMATED DRIVING SYSTEMS

CROSS-REFERENCE TO RELATED APPLICATIONS

The present application for patent claims priority to European Patent Office Application Ser. No. 21158017.0, entitled "PLATFORM FOR PERCEPTION SYSTEM DEVELOPMENT FOR AUTOMATED DRIVING SYSTEMS" filed on Feb. 19, 2021, assigned to the assignee hereof, and expressly incorporated herein by reference.

TECHNICAL FIELD

The present disclosure relates to methods and systems for performance evaluation and updating of a perception-development module of a vehicle equipped with an Automated Driving System (ADS).

BACKGROUND

During the last few years, the research and development activities related to autonomous vehicles has exploded in number and many different approaches are being explored. An increasing portion of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, there is ongoing research and development within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

Much of the current efforts for development of ADSs revolves around safely launching a first system to the market. However, once that is achieved it will be paramount to improve the system in a safe and efficient manner, both to achieve cost reductions as well as performance improvements. Generally, there are significant costs associated with the development and verification of safety of the ADS, especially related to field tests and the understanding of how the system behaves in traffic. Moreover, there are additional challenges in terms of managing the immense amounts of data generated by ADS equipped vehicles in order to develop and verify various ADS features, not only from a data storage, processing and bandwidth perspective, but also from a data security perspective.

There is accordingly a need in the art for new solutions for facilitating development and verification of ADSs in order to continuously be able to provide safer and more performant systems. As always, the improvements shall preferably be made without significant impact on the size, power consumption and cost of the on-board system or platform.

SUMMARY

It is therefore an object of the present invention to provide a method performed by a computing system for performance evaluation of a perception-development module of a vehicle, a computer-readable storage medium, a system, and a vehicle comprising such as system that alleviate all or at least some of the above-discussed drawbacks of presently known systems and methods.

This object is achieved by means of a provide a method performed by a computing system for performance evaluation of a perception-development module of a vehicle, a computer-readable storage medium, a system, and a vehicle as defined in the appended claims. The term exemplary is in the present context to be understood as serving as an instance, example or illustration.

According to a first aspect of the present invention, there is provided a method performed by a computing system for performance evaluation of a perception-development module of a vehicle, where the vehicle is equipped with an ADS. The method comprises storing, during a time period, a first set of perception data obtained from a perception module of the vehicle. The perception module is configured to generate the first set of perception data based on sensor data obtained from one or more vehicle-mounted sensors during the time period. The method further comprises forming, by post-processing the first set of perception data, a baseline worldview indicative of a scenario in the surrounding environment of the vehicle during the time period. The method further comprises obtaining a second set of perception data from the perception-development module. The perception-development module is configured to generate the second set of perception data based on a perception model and sensor data obtained from one or more vehicle-mounted sensors during the time period. The second set of perception data is indicative of a perceptive parameter of the surrounding environment of the vehicle during the time period. Furthermore, the method comprises matching the second set of perception data to the formed baseline worldview in order to identify a match between the perceptive parameter of the second set of perception data and a corresponding perceptive parameter in the baseline worldview. The method further comprises evaluating the obtained second set of perception data in reference to the baseline worldview in order to determine a cost function indicative of a performance of the perception-development module. The cost function is determined based on the identified match between the perceptive parameter of the second set of perception data and a corresponding perceptive parameter in the baseline worldview. Further, the method comprises updating one or more parameters of the perception model of the perception-development module by means of an optimization algorithm configured to minimize the calculated cost function.

According to a second aspect of the present invention, there is provided a (non-transitory) computer-readable storage medium storing one or more programs configured to be executed by one or more processors of an in-vehicle processing system, the one or more programs comprising instructions for performing the method according to any one of the embodiments disclosed herein. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

In accordance with a third aspect of the present invention there is provided a system for performance evaluation of a perception-development module of an ADS-equipped vehicle. The system comprises control circuitry configured to store, during a time period, a first set of perception data obtained from the perception module of the vehicle. The perception module is configured to generate the first set of perception data based on sensor data obtained from one or more vehicle-mounted sensors during the time period. Furthermore, the control circuitry is configured to form, by post-processing the first set of perception data, a baseline worldview indicative of a scenario in the surrounding environment of the vehicle during the time period. The control circuitry is further configured to obtain a second set of perception data from the perception-development module, where the perception-development module is configured to generate the second set of perception data based on a perception model and sensor data obtained from one or more vehicle-mounted sensors during the time period. The second set of perception data is indicative of a perceptive parameter of the surrounding environment of the vehicle during the time period. Furthermore, the control circuitry is configured to match the second set of perception data to the formed baseline worldview in order to identify a match between the perceptive parameter of the second set of perception data and a corresponding perceptive parameter in the baseline worldview. Then, the control circuitry is configured to evaluate the obtained second set of perception data in reference to the baseline worldview in order to determine a cost function indicative of a performance of the perception-development module based on the identified match between the perceptive parameter of the second set of perception data and a corresponding perceptive parameter in the baseline worldview. Still further, the control circuitry is configured to update one or more parameters of the perception model of the perception-development module based on the output of an optimization algorithm configured to minimize the calculated cost function. With this aspect of the invention, similar advantages and preferred features are present as in the previously discussed first aspect of the invention.

According to a fourth aspect of the present invention, there is provided a vehicle comprising a set of vehicle-mounted sensors configured to monitor a surrounding environment of the vehicle. The vehicle further comprises an automated driving system (ADS) having a perception module configured to generate a first set of perception data based on sensor data obtained from one or more of the set of vehicle-mounted sensors. The vehicle further has a perception development module configured to generate the second set of perception data based on a perception model and sensor data obtained from one or more of the set of vehicle-mounted sensors, and a system for performance evaluation of the perception-development module according to according to any one of the embodiments disclosed herein. With this aspect of the invention, similar advantages and preferred features are present as in the previously discussed first aspect of the invention.

The herein proposed methods, computer-readable storage media, systems, and vehicles accordingly provide a learning platform that utilizes the production system and sensors of the ADS in order to carry out a federated learning process for new software and hardware versions of various perception features in autonomous driving applications. In more detail, the herein proposed learning regime relies on a post-processing of the "worldview" (i.e. perception output) of the production ADS, whose performance has been validated and verified, so to construct a "baseline" towards which the output of the software/hardware under development is compared. Thereby readily providing advantages in terms of:
  Cost effective and time efficient development of new perception features for autonomous driving applications.
  Cost effective updates of the HW platform of the sensor hardware as well as the computational hardware of the ADS.
  Efficient utilization of available production resources in the production vehicles to facilitate the development of new perception features.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present invention is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

Figure 1:
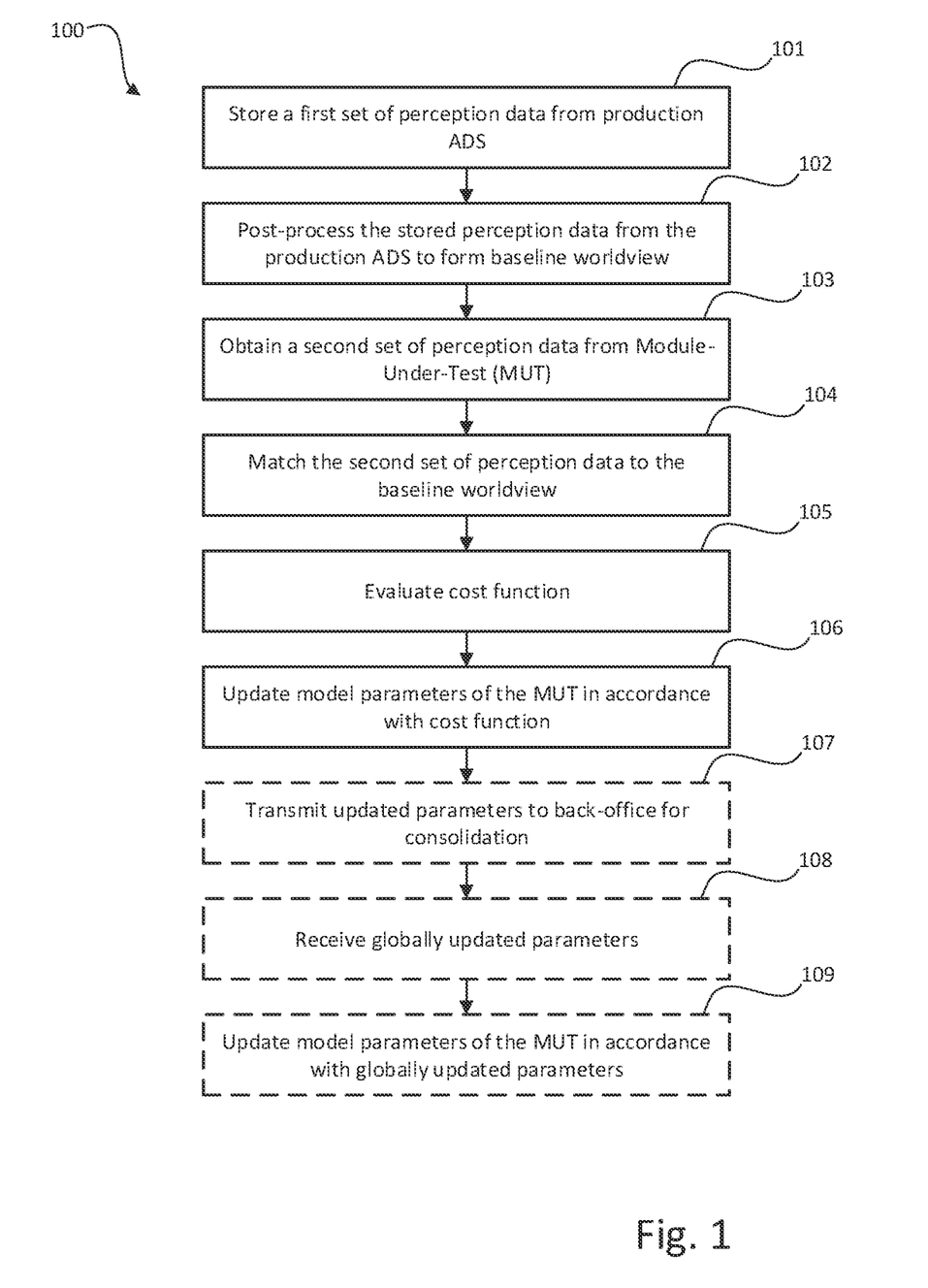
FIG. 1 is a schematic flow chart representation of a method 100 performed by a computing system for performance evaluation of a perception-development module of a vehicle in accordance with an embodiment of the present invention, where the vehicle is equipped with an Automated Driving System (ADS).

FIG. 1 is a schematic flow chart representation of a method 100 performed by a computing system for performance evaluation (and updating) of a perception-development module of a vehicle in accordance with an embodiment of the present invention. The method may also be understood as a method 100 performed by an in-vehicle computing system for automated development of a perception-development module. The vehicle is further equipped with an Automated Driving System (ADS). The term "perception-development module" may be understood as "Module Under Test" (MUT), meaning that is a "new" (under development) software and/or hardware perception feature. The perception feature may for example be an object detection feature, an object classification feature, an object state estimation feature, a road reference estimation feature, a free-space estimation feature, a road friction estimation feature, an object trajectory estimation feature, a target/object tracking feature, and/or drivable area estimation feature. In other words, the perception-development module may in the present context be understood as software and/or hardware configured to generate a perception output based on input from one or more vehicle-mounted sensors, where the module is currently "under development", and not yet "in production" (e.g. not verified/validated).

The method 100 comprises storing 101, during a time period, a first set of perception data obtained from a perception module (may also be referred to as a perception system) of the vehicle. The perception module is configured to generate the first set of perception data based on sensor data obtained from one or more vehicle-mounted sensors during the time period. A perception module/system is in the present context to be understood as a system responsible for acquiring raw sensor data from on-board sensors such as cameras, LIDARs RADARs, ultrasonic sensors, navigation system e.g. GPS, odometer and/or inertial measurement units, and converting this raw data into scene understanding. The term obtaining is herein to be interpreted broadly and encompasses receiving, retrieving, collecting, acquiring, and so forth.

The term "storing" perception data may refer to "storing in one or more memories", "storing on-board said vehicle", "storing in one or more memories on-board said vehicle", and/or "storing digitally and/or electronically" a set of perception data, and further to "collecting" and/or "obtaining" a set of perception data. The term "set" of perception data, on the other hand, may refer to "range", "amount", "series", "continuous and/or intermittent flow" and/or "collection" of perception data, whereas "perception data" may refer to "continuously and/or intermittently collected perception data". Furthermore, the term "perception" data may refer to "surroundings assessment" data, "spatial perception" data, "processed sensory" data and/or "temporal dependencies" data, whereas perception "data" may refer to perception "information" and/or "estimates". The term "obtained" from a perception module, on the other hand, may refer to "derived" from a perception model and/or "based on output data" from a perception module. whereas perception module configured to "generate the set of perception data" may refer to perception module/system adapted and/or configured to "estimate the surroundings of said vehicle", "estimate at least a portion of surroundings of said vehicle", "determine surroundings of said vehicle", "interpret sensory information relevant for the autonomous maneuvering of said vehicle", and/or "estimate surroundings of said vehicle and make model predictions of future states of the surroundings of said vehicle".

The term "perception model" is in the present context to be understood as a software algorithm configured to receive input in the form of sensor data (raw or having some level of pre-processing) and to therefore generate an output comprising a representation of at least a portion of the surrounding environment of the vehicle. The perception model may for example be in the form of a neural network, and the model parameters may accordingly be in the form of network weights.

The phrase storing "during" a time period may refer to storing "for" a time period, whereas time period "ranging" from a first time point to a second time point may refer to time period "extending" and/or "taking place" from a first time point to a second time point. "Time period" may refer to "pre-determinable time period" and/or "predetermined time period". "Time point", on the other hand, may refer to "point in time", whereas "from a first time point to a second time point" may refer to "from a first time point to a subsequent second time point". Thus, a number of "perception models" may be used independently for different tasks such as lane segmentation, traffic sign identification, free-space estimation. However, these outputs should preferably be fused and provided as input for various "decision and control" functions, which supply the control signals for maneuvering the vehicle autonomously.

Further, the method 100 comprises, forming 102, by post-processing the stored 101 first set of perception data, a baseline worldview. The baseline worldview comprises information indicative of a scenario in the surrounding environment of the vehicle during the time period. A scenario may be one or more momentary scenes at one or more points in time during the time period including the positions of detected objects, object classes/types, positions of lane markers, extensions of lane markers, free-space detections, and/or trajectories of detected objects. It should be noted that this list merely serves to exemplify the parameters included in a "scenario" and may include other parameters detectable by the vehicle's perception module as readily understood by the skilled person in the art.

Figure 2:
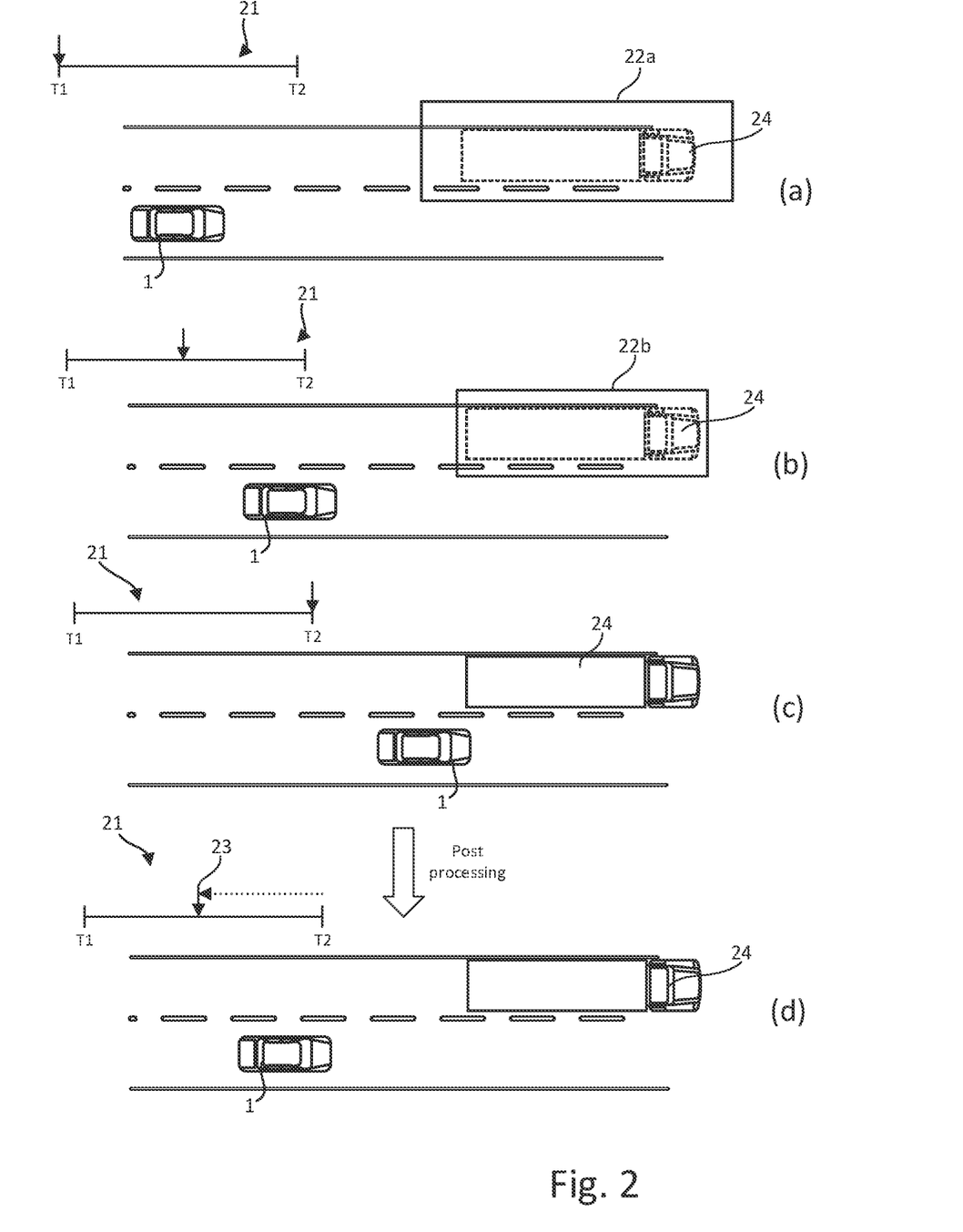
FIG. 2 is a schematic top-view illustration of a post-processing method in accordance with an embodiment of the invention in the form of a series of scenes depicting a temporal development of vehicle approaching an object.

The post-processing step 102 will now be further exemplified in reference to FIG. 2, which depicts a series (a)-(d) of schematic top-view illustrations of a vehicle 1 moving a road portion towards an external object 24. Each illustration is associated with a point in time within the time period 21 ranging from a first moment in time T1 to a second moment in time T2.

In the first illustration (a) the vehicle 1 (may also be referred to as ego-vehicle 1) is moving towards an external object, here in the form of a truck 24, that is traveling in the same direction on an adjacent lane on the road portion. However, due to the distance to the truck 24, the vehicle's perception system/module may not be able to determine, with a sufficiently high level of accuracy, the position of the external object, and to classify it as a truck. This is indicated by the box 22a enclosing the truck 24, which serves to schematically indicate the "uncertainties" of the detection and classification.

At a subsequent moment in time, i.e. illustration (b) of FIG. 2, the vehicle 1 is closer to the external object, and the uncertainties regarding the external object's 24 position and class/type are reduced, as indicated by the reduced size of the box 22b as compared to the first box 22a.

At yet another subsequent moment in time, i.e. illustration (c) of FIG. 2, the vehicle's 1 perception system/module is able to accurately determine the external object's 2 position and classify it as a truck 2. More specifically, the ego-vehicle 1 is now sufficiently close to the truck 2 to be able to classify it and estimate the truck's position on the road with a higher level of accuracy as compared to when the ego-vehicle 1 was located further away from the truck.

Then, by means of a suitable filtering technique and based on the temporal development of the "scenario", one is able to establish a "baseline worldview" at an intermediate point 23 in time between T1 and T2, as indicated in the bottom illustration in FIG. 2, i.e. in illustration (d) of FIG. 2. In more detail, the filtering may for example be based on the temporal development of the trajectories, positions, etc. in combination with predefined models (e.g. motion models) of the vehicle 1 and external objects 2. This established baseline worldview may subsequently used as a "ground truth" for training and/or validation of various perception output, and in particular for training and/or validation of the output obtained from the perception-development module. Thus, in some embodiments, the baseline world-view constitutes a ground truth for the second set of perception data.

In accordance with some embodiments, the step of forming 102 the baseline worldview comprises determining, based on post-processing a portion of the first set of perception data ranging back from the second time point to an intermediate time point between the first time point T1 and second time point T2 the baseline worldview indicative of the surrounding environment of the vehicle. The baseline worldview accordingly being conditional on the portion of the first set of perception data. Moreover, in accordance with some embodiments, the post-processing of the portion of the first set of perception data comprises running the portion of the first set of perception data through a backwards filter. Here, the backwards filter is configured to align a set of perceptive parameters of the first set of perception data at the intermediate time point based on a development of the state(s) of the set of perceptive parameters from the intermediate time point to the second time point T2.

In other words, with the increased knowledge of vehicle 1 surroundings as time passes from the intermediate time point 23 to the second time point T2 and by analyzing data in reverse temporal direction, one may be able to determine, with a higher level of accuracy, the "state" (i.e. classes, positions, trajectories, etc.) of the objects in the vehicle's 1 surroundings at the intermediate time point, than it was able to do at "run-time". In more detail, the post processing may for example comprise running the first set of perception data through a backwards filter configured to align e.g. the objects current and predicted future states with what happened in the future—i.e. from the intermediate time point to the second time point T2. The post-processing may include further processing steps than running it through a backwards filter. More specifically, the post-processing may include fusion of data from various sensors, as well as applying backward and forward filtering on the fused information. Suitable filters for this purpose may for example be Particle filters or different types of Kalman filters (e.g. extended Kalman filters).

Reverting back to FIG. 1, the method 100 further comprises obtaining 103 a second set of perception data from the perception-development module. The perception-development module is configured to generate the second set of perception data based on a perception model and sensor data obtained from one or more vehicle-mounted sensors during the time period. The second set of perception data is indicative of at least one perceptive parameter of the surrounding environment of the vehicle during at least a moment in time within the time period. For example, the second set of perception data may comprise a set of bounding boxes indicating a position and classification of a set of external objects (e.g. one or more vehicles) in the surrounding environment of the vehicle.

Figure 4:
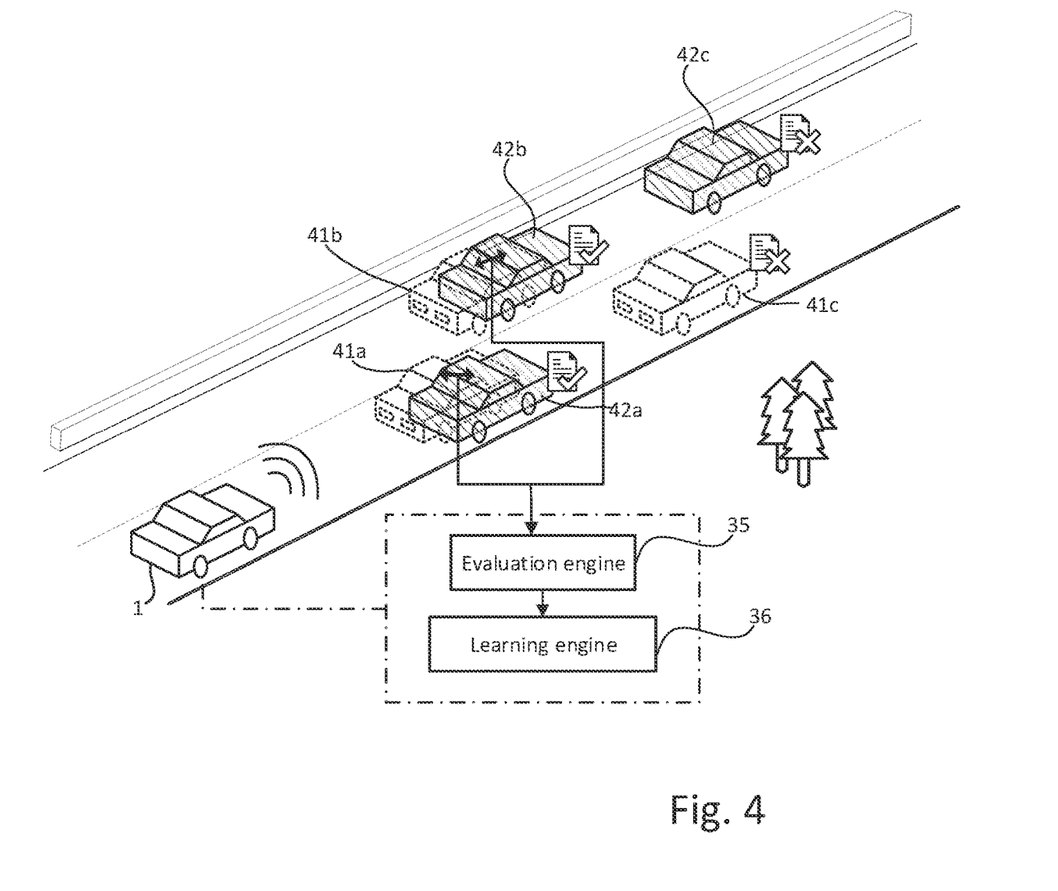
FIG. 4 is a schematic perspective view of a matching process for identifying a match between a baseline worldview and an output from a perception-development module in accordance with an embodiment of the present invention.

Further, the method 100 comprises matching 104 the second set of perception data to the formed baseline worldview in order to identify a match between the perceptive parameter of the second set of perception data and a corresponding perceptive parameter in the baseline worldview. In other words, the matching 104 may be construed as a comparison step between the second set of perception data and the formed baseline worldview so to identify a level of matching between one or more perceptive parameters (e.g. object positions) in the second set of perception data and the corresponding perceptive parameters in the baseline worldview. For example, the matching 104 may include comparing the position of an identified vehicle in the second set of perception data with the position of that vehicle in the baseline worldview (e.g. as illustrated in FIG. 4).

A purpose of the matching 104 is to match an object detected based on second set of perception data with one object from the baseline world view both corresponding to one unique object in the real world. After the corresponding objects from the two sets of perception data are matched together, the next step is to compare their associated perceptive parameter(s) (e.g. positions, speed, heading, etc.) and evaluate the performance of MUT. The matching 104 process will be further exemplified and elucidated with reference to FIGS. 4-6.

Still further, the method 100 comprises evaluating 105 the obtained second set of perception data in reference to the baseline worldview in order to determine a cost function. This cost function is indicative of a performance of the perception-development module based on the identified match between the perceptive parameter of the second set of perception data and a corresponding perceptive parameter in the baseline worldview. Stated differently, once a match 104 between the perceptive parameter of the second set of perception data and the corresponding perceptive parameter in the baseline worldview has been identified/established, one can calculate a cost function that indicates how well the "perception-development module" performed. Moreover, in some embodiments, the cost function (may also be referred to as a loss function) is determined based on the type of perceptive parameter. In other words, one cost function may be formed/defined if the perception model of the perception-development module is an object detection algorithm while another cost function may be formed/defined if it is a lane-tracing algorithm.

Moreover, in accordance with some embodiments, the matching 104 step comprises identifying a match between the perceptive parameter of the second set of perception data and a corresponding perceptive parameter in the baseline worldview. Then, an estimation error of the matched perceptive parameter of the second set of perception data is determined. For example, if the perception model of the perception-development module is an object detection algorithm configured to generate bounding boxes, then a difference between the location and dimensions of these bounding boxes in the "second set of perception data" and the location and dimensions of the matched bounding boxes in the "baseline worldview" may be used to derive the "estimation error". In more detail, if the perceptive parameter is an object position estimation or an object occupancy estimation. The estimation error may then be in the form of a "lateral and longitudinal offset of closest point" between the bounding box representation of an object in the second set of perception data and the bounding box representation of the corresponding object in the baseline worldview. The term "closest point" may be understood the closest point of the detected object to the ego-vehicle. Accordingly, in some embodiments, the step of evaluating the obtained second set of perception data comprises determining/forming a cost function based on the determined estimation error.

In some embodiments, the matching 104 of the second set of perception data to the formed baseline worldview is only performed on the second set of perception data and the baseline worldview representative of a region of interest in the surrounding environment of the vehicle. For example, one may limit an "area" within which the matching 104 process is performed, such that one only compares the two datasets represented an area within a specific viewing frustum or within a certain distance from the vehicle. Thereby, objects that are further away from the ego-vehicle may be ignored as they are more likely to be associated with higher uncertainties and therefore more difficult to "match". This may consequently result in reduced processing power requirements for the matching process.

Yet further, the method 100 comprises updating 106 one or more parameters of the perception model of the perception-development module by means of an optimization algorithm (e.g. back propagation for neural networks) configured to minimize the calculated cost function.

In some embodiments, the method 100 further comprises transmitting 107 the one or more updated parameters of the perception model of the perception-development module to a remote entity. The remote entity may for example be a central system or a cloud system capable of receiving and transmitting data to a fleet of ADS-equipped vehicles. Furthermore, in some embodiments, the method 100 comprises receiving 108 a set of globally updated parameters of the perception model of the perception-development module from the remote entity. The set of globally updated parameters are accordingly based on information obtained from a plurality of vehicles comprising the perception-development module. Once, the set of globally updated parameters have been received 108, the method 100 may further comprise updating 109 the perception model of the perception-development module based on the received set of globally updated parameters.

Further, in some embodiments, the transmitting 107 of the one or more updated model parameters is associated with a (predefined) trigger or criteria, where the updated model parameters are stored locally in the ego-vehicle until that trigger is detected or criteria is fulfilled. Once the trigger is detected, or once the criteria is fulfilled, the updated model parameters are transmitted 107 to the remote entity. Naturally, the time of transmission may further depend on external factors such as network availability and network quality. Some examples of triggers or criteria include:

Exceeding a number of updates. In other words, once the perception model has been exposed to N number of updates, the updated model parameters of the perception model are transmitted to the remote entity, where N may for example be any positive integer$\geq 2$.

Exceeding a threshold of change from the "base" perception model (e.g. base-algorithm weights). In more detail, once a model parameter of the perception model have been updated such that the updated value result in a change$\geq K$ % from the "base" value, where K may for example be any positive real value.

Moreover, the "base" perception model need not be the first perception model launched in the vehicles, but may for example be defined as the perception model obtained after the perception-development model has been updated 109 with the globally updated parameters. Thus, with every "global" update 109, a new "base" perception model is defined, which in turn dictates the triggers/thresholds described above.

In other words, the remote entity (may also be referred to as the "back-office"), consolidates the "learned" parameters of each vehicle in the entire fleet of vehicles, and pushes an update of the perception-development module to each vehicle in the fleet. Thereby, one may utilize an entire fleet of production vehicles (instead of a few specialized "test-vehicles") to develop and verify various perception features associated with an ADS. Moreover, since the data that is being transmitted between the vehicles and the remote entity is in the form of "model parameters" (e.g. network weights) instead of e.g. raw or processed sensor data, advantages in terms of bandwidth requirements, data storage, data security, data privacy, and compliance with data regulations are readily achievable. The "back-office" may in the present context be understood as a central entity responsible for the management and maintenance of the ADSs deployed in the vehicle fleet.

Executable instructions for performing these functions are, optionally, included in a non-transitory computer-readable storage medium or other computer program product configured for execution by one or more processors.

Accordingly, the present invention provides a time-efficient and cost-effective solution for developing consecutive releases of perception features for autonomous vehicles. In more detail, the present inventors realized that once there is a "first" ADS released and deployed in a fleet of production vehicles, one can capitalize on the huge efforts (in terms of time and financial investments) associated with this first release, in order to develop consecutive releases of various perception features. In more detail, it is herein suggested to use the vehicles "out in traffic" (i.e. production vehicles) to develop, test and verify new software and hardware. The solution proposed herein may be understood as a scheme of federated learning, effectively using learning at the edge (in each production vehicle) and then to potentially consolidate the learnt parameters/weights in a central/cloud unit. Stated differently, the present invention provides a solution that utilises the production vehicles to develop new perception features related to new sensor hardware as well as new algorithms for existing sensors by using federated learning.

To achieve this, the production vehicle's own worldview is post-processed and used as a reference, towards which the output of the software-(SW) or hardware-(HW)—under-development is compared. Therefore, the method and system disclosed herein effectively supports cost-effective development of the next generation sensor platform (HW as well as SW) to reduce system cost for future products/systems. Further, one may similarly utilize the teachings herein to improve the efficiency of e.g. the vision and fusion algorithms to allow for execution on leaner computational hardware and thereby provide additional cost reductions of the hardware platform.

In short, the present inventors realized that once the ADS in the production vehicles is deployed, it can be assumed that it has been proven sufficiently safe (at least under certain conditions) including the perception and its performance Therefore, a learning regime is herein proposed, where the worldview of the ADS is post-processed to construct a "baseline", towards which the output of the software-/hardware-under-development can be compared. Through this comparison a cost function can be calculated and an update of the SW parameters can be locally conducted according to this cost function. Furthermore, the locally updated SW across the fleet of production vehicles may be subsequently consolidated in the in a central system in order to push a "globally" updated version of the SW.

Moreover, in some embodiments, the perception-development module (i.e. the module-under-test) may use the worldview as supplied by the "production platform" (i.e. the perception module of the ADS) as input. In other words, the perception-development module may be configured to generate the second set of perception data based on the perception model and the first set of perception data. In this example embodiment, the second set of perception data may comprise one or more prediction parameters (e.g. predictions of trajectories of external objects). In such embodiments, the matching step as described in the foregoing may be omitted, as there is no need for any matching between the outputs (of the perception-development module and the platform perception module) as their "prediction models" rely on the same input.

Accordingly, the second set of perception data may be received/obtained from a perception-development module configured to generate the second set of perception data based on a perception model and perception data obtained from the perception module (of the production platform) during the time period. The second set of perception data may be indicative of one or more prediction parameters of the surrounding environment of the vehicle during the time period. The evaluation 105 may accordingly be performed such that the one or more prediction parameters are evaluated in reference to the baseline worldview in order to determine a cost function indicative of a performance of the perception-development module based on one or more error parameters derived from the evaluation.

Figure 3:
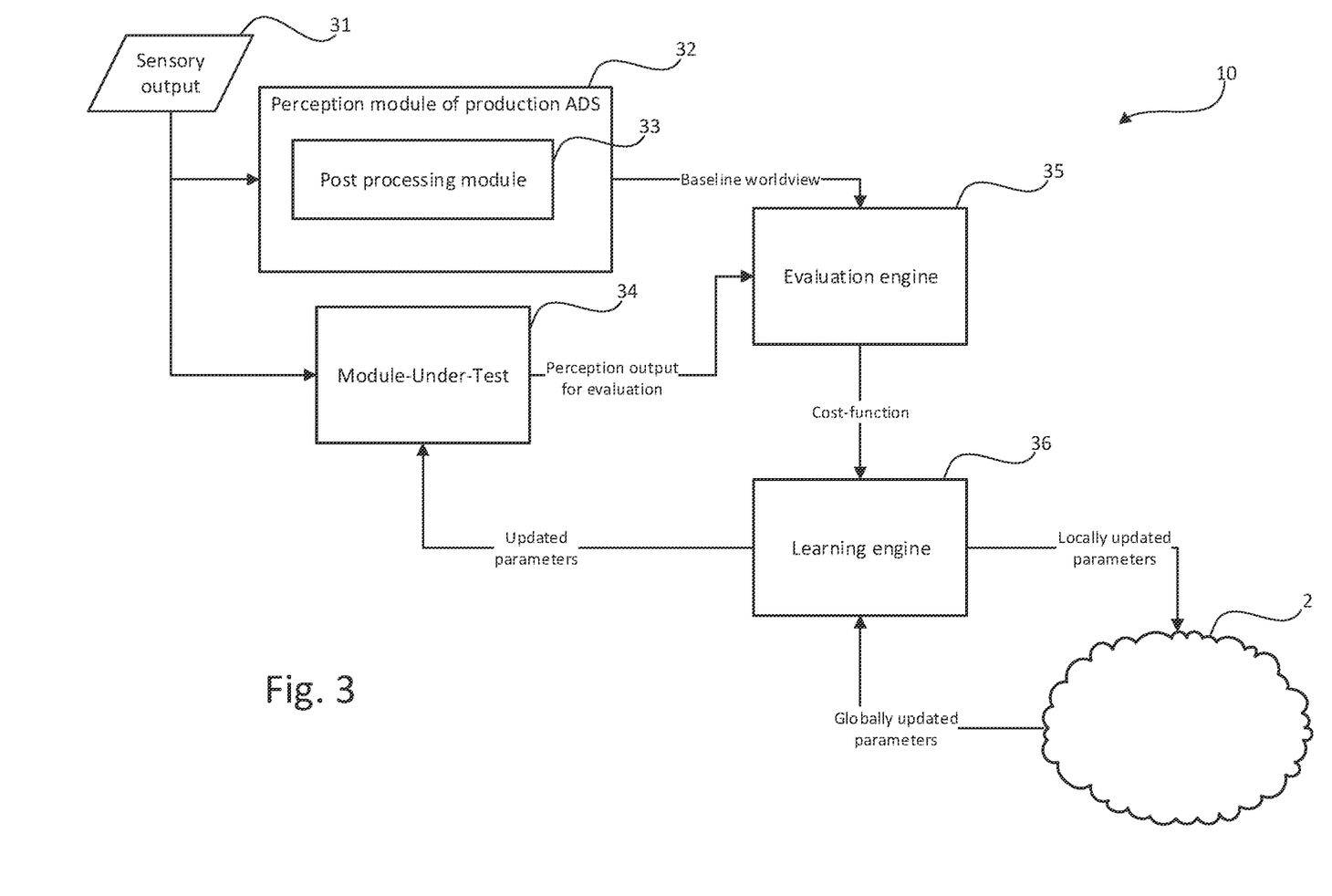
FIG. 3 is a schematic block diagram representation of a system for performance evaluation of a perception-development module of a vehicle in accordance with an embodiment of the present invention.

FIG. 3 is a schematic block diagram representation of a system 10 for performance evaluation of a perception-development module of a vehicle, where the vehicle is equipped with an Automated Driving System (ADS). In general, FIG. 3 depicts the flow of information through exposure to an event in the vehicle to the transmission and subsequent consolidation in the "back-office" 2. The system 10 comprises control circuitry configured to perform the functions of the methods disclosed herein, where the functions may be included in a non-transitory computer-readable storage medium or other computer program product configured for execution by the control circuitry. However, in order to better elucidate the present invention, the control circuitry is represented as various "modules" in FIG. 3, each of them linked to one or more specific functions.

It should be noted that the "perception output for evaluation" that is compared in the "evaluation engine" 35 could be any type of perception output e.g. objects, their states, free-space (the absence of objects), lanes, road position, driveable area, and combinations thereof.

The system 10 comprises control circuitry configured to store, during a time period, a first set of perception data obtained from a perception module 32 of the vehicle. The perception module 32 is configured to generate the first set of perception data based on sensor data 31 obtained from one or more vehicle-mounted sensors during the time period. The sensor data 31 may for example output from one or more of a RADAR device, a LIDAR device, a camera, and ultrasonic sensor, and so forth. In other words, a "perception module" (i.e. the perception system of the production platform) is in the present context to be understood as a system responsible for acquiring raw sensor data from onboard sensors such as cameras, LIDARs and RADARs, ultrasonic sensors, and converting this raw data into scene understanding including state estimates and predictions thereof (i.e. to a "worldview").

The first set of perception data may for example be stored or saved in a data buffer (not shown), where this first set of perception data may be understood as data indicative of the vehicle's surroundings. This may for example be detected objects or objects' states and/or vehicle localization, and/or statistical and physical model predictions of future states, derived continuously and/or intermittently from a first time point T1 to a second time point T2. The time period—and correspondingly the length of the optional data buffer—may be of any arbitrary size deemed feasible, e.g. in consideration of data capacity restraints and/or characteristics of the ADS, and may for instance range from under a second up to several minutes, or more preferred, from a few seconds up to less than a minute.

Further, the system 10 comprises a post-processing module 33 for forming a baseline worldview indicative of a scenario in the surrounding environment of the vehicle during the time period. The baseline worldview is formed based on the perception data generated by the perception module 32 of the production ADS. It should be noted that the term "forming, by post-processing the first set of perception data" does not necessarily mean that all of the stored data is post-processed, but should be construed as that at least a portion or at least a range of the stored perception data is post-processed.

Still further, a second set of perception data is generated by a perception-development module (i.e. a Module Under Test, MUT) 34. This second set of data is obtained or received by an "evaluation engine" 35 of the system 10. The perception-development module 34 is configured to generate the second set of perception data based on a perception model and sensor data obtained from one or more vehicle-mounted sensors during the time period. The second set of perception data may be understood as a "perception output" from the MUT 34, and it is indicative of a perceptive parameter of the surrounding environment of the vehicle. For example, the MUT 34 may comprise a lane tracing/tracking algorithm or a road geometry estimation algorithm. Accordingly, the output from the MUT may be a road reference feature estimation, such as e.g. a representation of the road or lane geometry in the surrounding environment of the vehicle during the time period.

Moreover, the input to the perception-development module 34 could be any combination of existing production sensors, their raw output, the raw detections or any more or less processed state in the chain. It could also be any combination of newly mounted sensors and their output (i.e. sensor output that is not used to generate the baseline worldview). For example, if one would want to test and evaluate an object detection algorithm that is based on a different type of input data from a new type of sensor as compared to the "production platform's" object detection algorithm.

The evaluation engine 35 is configured to match the second set of perception data to the formed baseline worldview in order to identify a match between the perceptive parameter of the second set of perception data and a corresponding perceptive parameter in the baseline worldview. In other words, the evaluation engine 35 is configured to match the "perception-output for evaluation" with the corresponding features in the baseline worldview. Furthermore, the evaluation engine is configured to evaluate the obtained second set of perception data in reference to the baseline worldview in order to determine a cost function. This cost function is indicative of a performance of the perception-development module based on the identified match between the perceptive parameter of the second set of perception data and a corresponding perceptive parameter in the baseline worldview.

The determined cost function is then received by the learning engine 36, which is configured to update one or more parameters of the perception model of the perception-development module 34 by means of an optimization algorithm configured to minimize the calculated cost function. The learning engine 36 is further configured to transmit the one or more locally updated parameters to a remote entity 2, where they are consolidated with updates received from other vehicles in the fleet, and then transmitted back to the learning engine 36 as a set of globally updated parameters. Then, the learning engine 36 may update the perception model of the perception-development module 34 based on the received set of globally updated parameters.

The learning platform as proposed herein exposes the vision/perception baseline locally inside the platform such that the comparison/cost function used for evaluation or learning of the perception-development module 34 can be customised according to the present need. Further, the platform is proposed to include the redundant computational power necessary to achieve the comparison as well as the learning steps.

From a more holistic perspective, the methods and systems as disclosed herein could be used to develop and launch new perception software or hardware versions in accordance with the following stages. Firstly, there is a learning stage or phase and a consolidation phase where the new module is updated according to the flows depicted in FIGS. 1 and 3. Once as sufficient level of maturity is reached, the consolidated model parameters are pushed to the vehicle fleet for validation. In this validation the step, the "learning part" of the process is not executed, i.e. in reference to FIG. 3, the learning engine 36 is "short-circuited". Thus, only the evaluation part of the process is used. Then, if the new module passes the validation phase (i.e. the fail-rate is sufficiently low) in each vehicle of the fleet of vehicles, the final SW can be launched. However, if the validation fails, one can return to the beginning and start a new iteration of the process.

FIG. 4 is a schematic perspective view of a matching process for matching a second set of perception data to a formed baseline worldview. In the illustrated example, the second set of perception data comprises an object detection estimation, and an example of how an estimation error of the detection is propagated to the evaluation and learning engines 34, 36 to update the model parameters of the perception-development module of the vehicle 1. The estimation error (indicated by the double-headed arrows) may for example a difference in the location between the bounding boxes around the detected objects 41*a-c* indicated in the second set of perception data and the bounding boxes around the corresponding objects 42*a-c* in the baseline worldview.

Moreover, FIG. 4 also serves to elucidate the matching process described in the foregoing. Here, a match between the perceptive parameters of the second set of perception data and the corresponding perceptive parameters in the baseline worldview was identified for two of the vehicles 41*a-b* detected by the perception-development module, while no match could be identified for a third vehicle 41*c*. In the subsequent evaluation process, only the "matched" data, i.e. the identified matches, are used for determining the cost function. This is in order to avoid propagating a mismatch (i.e. an erroneous interpretation of the surroundings) into the updating of the parameters of the perception model. Thus, the matching process serves to ensure that the correct comparison is being made between the second set of perception data and the first set of perception data.

For example, if the second set of perception data is indicative of a blue vehicle and a red vehicle in front of the ego-vehicle, the matching process ensures that the red vehicle is matched to the corresponding red vehicle in the baseline worldview and the blue vehicle is matched to the corresponding blue vehicle in the baseline worldview. Otherwise, the perception model of the perception-development module may be trained with erroneous data (based on erroneous conclusions), which would decrease the performance of the perception-development module. Thus, as illustrated in FIG. 4, the third vehicle 41*c* as detected by the perception-development module was not sufficiently close to any vehicle in the baseline worldview to identify any match, therefore this "data entry" may simply be discarded in the subsequent evaluation and learning/updating processes.

Figure 5:
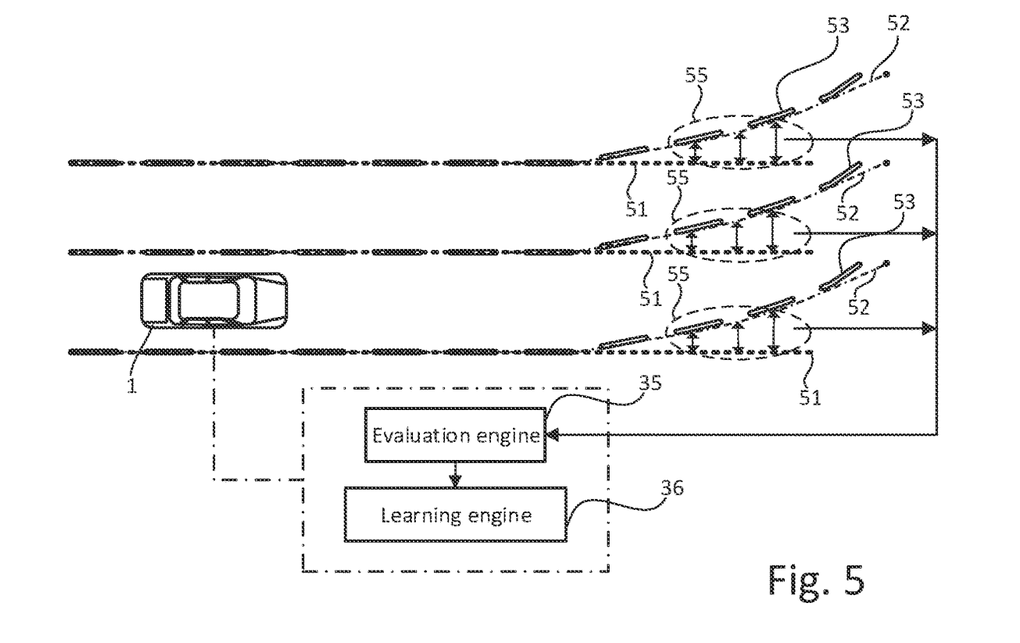
FIG. 5 is a schematic top view of a matching process for identifying a match between a baseline worldview and an output from a perception-development module in accordance with an embodiment of the present invention.
Figure 6:
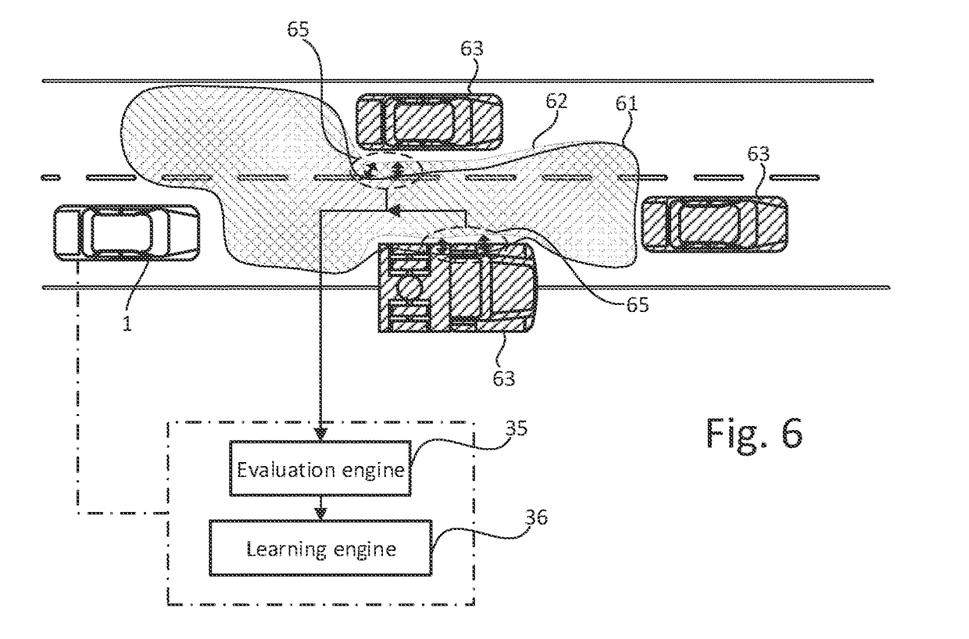
FIG. 6 is a schematic top view of a matching process for identifying a match between a baseline worldview and an output from a perception-development module in accordance with an embodiment of the present invention.

FIGS. 5 and 6 show the corresponding evaluation processes for perception models in the form of lane geometry estimations algorithms (FIG. 5) and free-space detection algorithms (FIG. 6). In more detail, FIG. 5 is a schematic top-view illustration of a vehicle according to an embodiment of the present invention traveling on a road portion. The road portion has two lanes, and curves to the left in front of the vehicle 1. The "true" lane markings are indicated by reference numeral 53, the baseline worldview's lane geometry estimation is indicated by reference numeral 52, while the perception-development module's lane geometry estimation is indicated by reference numeral 51. Analogously as before, a match between the lane traces of the perception-development modules output and the baseline worldview is identified, and an estimation error 55 is derived in order to compute the cost function. Here the estimation error 55 is indicated as a difference between the locations/geometries of the lane geometry estimations 51, 52. Moreover, in some embodiments, the evaluation is performed in the image plane on a pixel level. Thereby, one can evaluate and train camera software directly on the pixel level.

Further, FIG. 6 is a schematic top-view illustration of a vehicle according to an embodiment of the present invention traveling on a road portion. The road portion has two lanes, and three external objects 63 in the form of two cars and a tractor located in front of the vehicle. The free-space estimation made by the production platform, i.e. the free-space estimation of the baseline worldview is indicated by reference numeral 62, while the free-space estimation of the perception-development module is indicated by reference numeral 61. The estimation error 65 is, in the illustrated example, simply derived by a measurement or metric indicative of the non-overlapping parts of the two free-space estimations 61, 62. In terms of set theory this may be understood as the symmetric difference 65 between the free-space set defined by the free-space estimation of the perception development module and the free-space set defined by the baseline worldview. Analogously as for the example embodiments discussed above in reference to FIGS. 4 and 5, the estimation error 65 is used to compute the cost function, which is in turn used to update one or more parameters of the perception model of the perception-development module.

Free-space areas may in the present context be understood as areas in the surrounding environment of the ego-vehicle absent of objects (e.g. other vehicles, pedestrians, barriers, animals, bicycles, static objects, etc.). Thus, the location of free-space areas may be understood as estimates of areas absent of external objects (static and dynamic objects). One can consider an estimation of "driveable area" in an analogous fashion, where in addition to the estimation of areas absent of objects (as in the case of free space) the estimation also includes the presence of a road surface.

Figure 7:
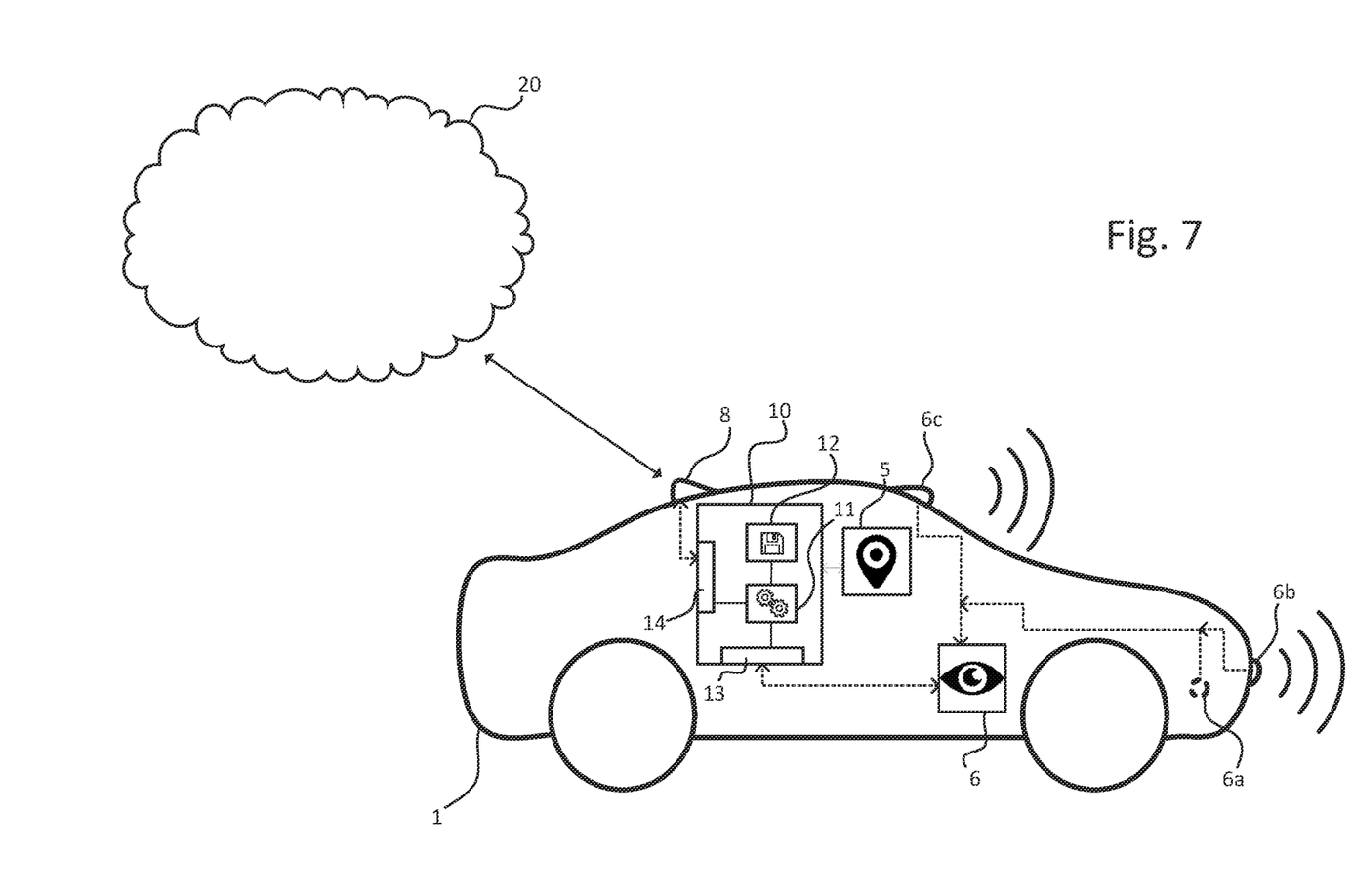
FIG. 7 is a schematic side-view of a vehicle comprising a system for performance evaluation of a perception-development module of a vehicle in accordance with an embodiment of the present invention.

FIG. 7 depicts a schematic side view of a vehicle 1 comprising a system 10 for performance evaluation of a perception-development module of an ADS-equipped vehicle in accordance with an embodiment of the present invention. The vehicle 1 further comprises a perception module/system 6 (i.e. the perception system of the production platform), and a localization system 5. A perception system 6 is in the present context to be understood as a system responsible for acquiring raw sensor data from on-board sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

In more detail, the perception module/system 6 may refer to any commonly known system and/or functionality, e.g. comprised in one or more electronic control modules and/or nodes of the vehicle 1, adapted and/or configured to interpret sensory information—relevant for driving of the vehicle 1—to identify e.g. obstacles, vehicle lanes, relevant signage, appropriate navigation paths etc. The exemplified perception system 6 may thus be adapted to rely on and obtain inputs from multiple data sources, such as automotive imaging, image processing, computer vision, and/or in-car networking, etc., in combination with sensory information. Such exemplifying sensory information may for instance be derived from one or more optional surrounding detecting sensors 6a-c comprised in and/or provided on-board the vehicle 1. The surrounding detecting sensors 6a-c may be represented by any arbitrary sensors adapted to sense and/or perceive the vehicle's 1 surroundings and/or whereabouts, and may e.g. refer to one or a combination of one or more of radar, LIDAR, sonar, camera, navigation system e.g. GPS, odometer and/or inertial measurement units.

The system 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for performance evaluation of a perception-development module of a vehicle 1 according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

The control circuitry 11 is configured to store, during a time period, a first set of perception data obtained from the perception module 6 of the vehicle. The perception module 6 is configured to generate the first set of perception data based on sensor data obtained from one or more vehicle-mounted sensors 6a-c during the time period. Furthermore, the control circuitry 11 is configured to form, by post-processing the first set of perception data, a baseline worldview indicative of a scenario in the surrounding environment of the vehicle during the time period.

The control circuitry 11 is further configured to obtain a second set of perception data from the perception-development module (not shown in FIG. 7), where the perception-development module is configured to generate the second set of perception data based on a perception model and sensor data obtained from one or more vehicle-mounted sensors 6a-c during the time period. The second set of perception data is indicative of a perceptive parameter of the surrounding environment of the vehicle during the time period. It should be noted that the sensor data used for generating the first set of perception data need not be the same sensor data as used for generating the second set of perception data. In some embodiments, the first set of perception data is generated based on a first set of sensor data, while the second set of perception data is generated based on a second set of sensor data. In some embodiments, first set of sensor data is the same as the second set of sensor data, while in other embodiments the second set of sensor data is a subset of the first set of sensor data. Alternatively, the first set of sensor data is different from the second set of sensor data.

Furthermore, the control circuitry 11 is configured to match the second set of perception data to the formed baseline worldview in order to identify a match between the perceptive parameter of the second set of perception data and a corresponding perceptive parameter in the baseline worldview. Then, the control circuitry 11 is configured to evaluate the obtained second set of perception data in reference to the baseline worldview in order to determine a cost function indicative of a performance of the perception-development module based on the identified match between the perceptive parameter of the second set of perception data and a corresponding perceptive parameter in the baseline worldview. Still further, the control circuitry 11 is configured to update one or more parameters of the perception model of the perception-development module based on the output of an optimization algorithm configured to minimize the calculated cost function.

Further, the vehicle 1 may be connected to external network(s) 20 via for instance a wireless link (e.g. for transmitting and receiving model parameters). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the system 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of forming the baseline worldview and obtaining the second set of perception data may be interchanged based on a specific realization. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:
1. A method performed by a computing system for performance evaluation of a perception-development module of a vehicle, wherein the vehicle is equipped with an Automated Driving System (ADS), the method comprising:

storing, during a time period, a first set of perception data obtained from a perception module of the vehicle, the perception module being configured to generate the first set of perception data based on sensor data obtained from one or more vehicle-mounted sensors during the time period;

forming, by post-processing the first set of perception data, a baseline worldview indicative of a scenario in a surrounding environment of the vehicle during the time period;

obtaining a second set of perception data from the perception-development module, wherein the perception-development module is configured to generate the second set of perception data based on a perception model and sensor data obtained from one or more vehicle-mounted sensors during the time period;

wherein the second set of perception data is indicative of a perceptive parameter of the surrounding environment of the vehicle during the time period;

matching the second set of perception data to the formed baseline worldview in order to identify a match between the perceptive parameter of the second set of perception data and a corresponding perceptive parameter in the baseline worldview;

evaluating the obtained second set of perception data in reference to the baseline worldview in order to determine a cost function indicative of a performance of the perception-development module based on the identified match between the perceptive parameter of the second set of perception data and a corresponding perceptive parameter in the baseline worldview;

updating one or more parameters of the perception model of the perception-development module by means of an optimization algorithm configured to minimize a calculated cost function; and wherein the post-processing of the first set of perception data comprises running a portion of the first set of perception data through a backwards filter configured to align a set of perceptive parameters of the first set of perception data at an intermediate time point of the time period based on a development of state(s) of the set of perceptive parameters from the intermediate time point to a second time point of the time period.

2. The method according to claim 1, wherein a baseline world-view constitutes a ground truth for the second set of perception data.

3. The method according to claim 2, wherein the perceptive parameter comprises at least one of:
an object detection estimation;
an object classification estimation;
an object state estimation;
a road reference feature estimation;
a free-space estimation;
a road friction estimation;
an object trajectory estimation; and
a drivable-area estimation.

4. The method according to claim 3, further comprising:
transmitting the one or more updated parameters of the perception model of the perception-development module to a remote entity;
receiving a set of globally updated parameters of the perception model of the perception-development module from the remote entity, wherein the set of globally updated parameters are based on information obtained from a plurality of vehicles comprising the perception-development module; and
updating the perception model of the perception-development module based on the received set of globally updated parameters.

5. The method according to claim 4, wherein the time period ranges from a first time point to a second time point, and wherein the step of forming the baseline worldview comprises:
determining, based on post processing a portion of the first set of perception data ranging back from the second time point to an intermediate time point between the first and second time points, the baseline worldview indicative of the surrounding environment of the vehicle conditional on the portion of the first set of perception data.

6. The method according to claim 1, wherein the matching of the second set of perception data to the formed baseline worldview comprises:
identifying a match between the perceptive parameter of the second set of perception data and a corresponding perceptive parameter in the baseline worldview; and
determining an estimation error of the matched perceptive parameter of the second set of perception data;
wherein the step of evaluating the obtained second set of perception data comprises determining a cost function based on the determined estimation error.

7. The method according to claim 6, wherein the cost function is determined based on a type of perceptive parameter.

8. The method according to claim 7, wherein the matching of the second set of perception data to the formed baseline worldview is only performed on the second set of perception data and baseline worldview representative of a region of interest in the surrounding environment of the vehicle.

9. A non-transitory computer-readable storage medium storing one or more instructions configured to be executed by one or more processors of an in-vehicle processing system, the one or more instructions for performing the method according to claim 1.

10. A system for performance evaluation of a perception-development module of a vehicle, wherein the vehicle is equipped with an Automated Driving System (ADS) the system comprising control circuitry configured to:
store, during a time period, a first set of perception data obtained from a perception module of the vehicle, the perception module being configured to generate the first set of perception data based on sensor data obtained from one or more vehicle-mounted sensors during the time period;
form, by post-processing the first set of perception data, a baseline worldview indicative of a scenario in the surrounding environment of the vehicle during the time period;
obtain a second set of perception data from the perception-development module, wherein the perception-development module is configured to generate the second set of perception data based on a perception model and sensor data obtained from one or more vehicle-mounted sensors during the time period;
wherein the second set of perception data is indicative of a perceptive parameter of the surrounding environment of the vehicle during the time period;
match the second set of perception data to the formed baseline worldview in order to identify a match between the perceptive parameter of the second set of perception data and a corresponding perceptive parameter in the baseline worldview;

evaluate the obtained second set of perception data in reference to the baseline worldview in order to determine a cost function indicative of a performance of the perception-development module based on the identified match between the perceptive parameter of the second set of perception data and a corresponding perceptive parameter in the baseline worldview;

update one or more parameters of the perception model of the perception-development module by means of an optimization algorithm configured to minimize the calculated cost function; and wherein the post-processing of the first set of perception data comprises to run a portion of the first set of perception data through a backwards filter configured to align a set of perceptive parameters of the first set of perception data at an intermediate time point of the time period based on a development of state(s) of the set of perceptive parameters from the intermediate time point to a second time point of the time period.

11. A vehicle comprising:

a set of vehicle-mounted sensors configured to monitor a surrounding environment of the vehicle;

an automated driving system (ADS) having a perception module configured to generate a first set of perception data based on sensor data obtained from one or more of the set of vehicle-mounted sensors;

a perception development module configured to generate the second set of perception data based on a perception model and sensor data obtained from one or more of the set of vehicle-mounted sensors; and a system for performance evaluation of a perception-development module of a vehicle, wherein the vehicle is equipped with the ADS and the system comprising control circuitry configured to:

store, during a time period, a first set of perception data obtained from a perception module of the vehicle, the perception module being configured to generate the first set of perception data based on sensor data obtained from one or more vehicle-mounted sensors during the time period;

form, by post-processing the first set of perception data, a baseline worldview indicative of a scenario in the surrounding environment of the vehicle during the time period;

obtain a second set of perception data from the perception-development module, wherein the perception-development module is configured to generate the second set of perception data based on a perception model and sensor data obtained from one or more vehicle-mounted sensors during the time period;

wherein the second set of perception data is indicative of a perceptive parameter of the surrounding environment of the vehicle during the time period;

match the second set of perception data to the formed baseline worldview in order to identify a match between the perceptive parameter of the second set of perception data and a corresponding perceptive parameter in the baseline worldview;

evaluate the obtained second set of perception data in reference to the baseline worldview in order to determine a cost function indicative of a performance of the perception-development module based on the identified match between the perceptive parameter of the second set of perception data and a corresponding perceptive parameter in the baseline worldview;

update one or more parameters of the perception model of the perception-development module by means of an optimization algorithm configured to minimize the calculated cost function; and wherein the post-processing of the first set of perception data comprises to run a portion of the first set of perception data through a backwards filter configured to align a set of perceptive parameters of the first set of perception data at an intermediate time point of the time period based on a development of state(s) of the set of perceptive parameters from the intermediate time point to a second time point of the time period.

* * * * *